US009379901B2

(12) United States Patent
Kim et al.

(10) Patent No.: US 9,379,901 B2
(45) Date of Patent: Jun. 28, 2016

(54) COMMUNICATION METHOD USING MULTI-RADIO AND COMMUNICATION APPARATUS (75) Inventors: Tae Seok Kim, Hwaseong-si (KR); Tae Rim Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 13/158,188

(22) Filed: Jun. 10, 2011

(65) Prior Publication Data

US 2012/0076020 A1    Mar. 29, 2012

(30) Foreign Application Priority Data

Sep. 28, 2010    (KR) .................. 10-2010-0093634

(51) Int. Cl.
*H04L 12/18*    (2006.01)
*H04L 12/855*    (2013.01)
*H04L 1/18*    (2006.01)

(52) U.S. Cl.
CPC ........... *H04L 12/1868* (2013.01); *H04L 12/189* (2013.01); *Y02B 60/50* (2013.01)

(58) Field of Classification Search
None
See application file for complete search history.

(56) References Cited

U.S. PATENT DOCUMENTS

| 6,842,424 | B1 | 1/2005 | Key et al. |
| 7,299,006 | B1* | 11/2007 | Rofougaran et al. ............ 455/20 |
| 2001/0010689 | A1* | 8/2001 | Awater .................. H04W 16/14 370/344 |
| 2002/0002035 | A1* | 1/2002 | Sim et al. ........................ 455/41 |
| 2002/0175819 | A1* | 11/2002 | Joo ............................ 340/573.1 |
| 2003/0058830 | A1* | 3/2003 | Schmidt ........................ 370/347 |
| 2006/0203758 | A1* | 9/2006 | Tee ........................ H04W 88/04 370/315 |
| 2006/0239207 | A1* | 10/2006 | Naghian ............... H04L 45/125 370/254 |
| 2007/0025318 | A1* | 2/2007 | Benveniste ......... H04W 72/005 370/347 |
| 2008/0175197 | A1* | 7/2008 | Shao ..................... H04W 72/02 370/329 |
| 2008/0176561 | A1* | 7/2008 | Shao ..................... H04W 8/005 455/434 |
| 2009/0080356 | A1 | 3/2009 | Song et al. |
| 2009/0080360 | A1 | 3/2009 | Song |
| 2009/0100170 | A1* | 4/2009 | Schneider et al. ............ 709/224 |
| 2009/0182853 | A1* | 7/2009 | Cho et al. ...................... 709/222 |
| 2009/0274101 | A1* | 11/2009 | Sakoda et al. ................. 370/328 |
| 2010/0091760 | A1* | 4/2010 | Yoon ....................... G04G 5/002 370/350 |
| 2010/0183027 | A1 | 7/2010 | Mueller |

(Continued)

FOREIGN PATENT DOCUMENTS

| CN | 101273648 A | 9/2008 |
| CN | 101491053 A | 7/2009 |

(Continued)

OTHER PUBLICATIONS

International Search Report issued on Jan. 4, 2011, in counterpart PCT International Patent Application No. PCT/KR/2011/004400.

(Continued)

*Primary Examiner* — Ayaz Sheikh
*Assistant Examiner* — Mariela Vidal Carpio
(74) *Attorney, Agent, or Firm* — NSIP Law (57) ABSTRACT

Provided is a communication method and apparatus using a multi-radio. The communication method includes establishing a link via at least one node included in a group that uses a low data-rate radio (LDR); transmitting a data frame to the at least one node included in the group; and receiving, using a multi-radio based on an availability of the LDR, an acknowledgement (ACK) with respect to the transmitted data frame.

23 Claims, 9 Drawing Sheets

(56) References Cited

U.S. PATENT DOCUMENTS

| | | | |
|---|---|---|---|
| 2010/0268825 A1* | 10/2010 | Jeong et al. | 709/226 |
| 2010/0303128 A1* | 12/2010 | Isley | 375/132 |
| 2011/0167182 A1* | 7/2011 | Palin et al. | 710/105 |
| 2011/0299488 A1* | 12/2011 | Kim et al. | 370/329 |

FOREIGN PATENT DOCUMENTS

| | | | |
|---|---|---|---|
| EP | 1 742 426 | 1/2007 | |
| EP | 1119137 A1 | 7/2011 | |
| JP | 2001-217853 | 8/2001 | |
| JP | 2004-135346 A | 4/2004 | |
| KR | 10-2003-0093592 | 12/2003 | |
| KR | 10-0547133 | 1/2006 | |
| WO | WO 2008/157526 | 12/2008 | |
| WO | WO 2010/067998 A2 * | 6/2010 | H04B 7/26 |

OTHER PUBLICATIONS

Japanese Office Action issued Nov. 25, 2014 in counterpart Japanese Application No. JP 2013-531471.

Chinese Office Action issued on Nov. 2, 2015 in counterpart Chinese Patent Application No. 201180046918.4 (16 pages, with English translation).

* cited by examiner

COMMUNICATION METHOD USING MULTI-RADIO AND COMMUNICATION APPARATUS

CROSS-REFERENCE TO RELATED APPLICATION(S)

This application claims the benefit under 35 U.S.C. §119(a) of Korean Patent Application No. 10-2010-0093634, filed on Sep. 28, 2010, in the Korean Intellectual Property Office, the entire disclosure of which is incorporated herein by reference for all purposes.

FIELD

The following description relates to packet radio communications that perform multicast and broadcast of a data frame between nodes of a network.

BACKGROUND

Terminals, such as a smart phone, a laptop, or the like, include multiple radios. These radios may employ, for example, an 802.11 wireless local area network (WLAN) scheme, a Bluetooth scheme, and/or the like. In some cases, the multiple radio schemes may be classified as either (i) a high data-rate radio (HDR) having a high transmission rate and high power consumption for transmission and reception, and (ii) a low data-rate radio (LDR) having a low transmission rate and low power consumption for transmission and reception compared with the HDR. The HDR may include the WLAN scheme and the LDR may include the Bluetooth scheme.

Multiple terminals included in the same group may share data using a multicast communication and a broadcast communication schemes, and may transmit a massive capacity multimedia stream.

Conventionally, the multicast communication and broadcast communication schemes do not request an acknowledgement (ACK) with respect to a transmitted packet. Accordingly, retransmission in a media access control (MAC) layer is not performed and thus, a reliability of data is low. To improve the reliability of the data, a link data rate may need to be low. The terminals, however, may have difficulty in transmitting massive capacity multimedia stream that is sensitive to a quality of service (QoS).

When multiple groups that simultaneously perform the multicast and broadcast communication exist, a collision may occur due to interference between adjacent groups. The collision may lead a data loss.

SUMMARY

In one general aspect, there is provided a communication method, including establishing a link via at least one node included in a group that uses a low data-rate radio (LDR), transmitting a data frame to the at least one node included in the group, and receiving, using a multi-radio based on an availability of the LDR, an acknowledgement (ACK) with respect to the transmitted data frame.

The receiving may include receiving the ACK, using the LDR or a high data-rate radio (HDR) based on the availability of the LDR.

The establishing may include establishing the link via the at least one node included in the group, using a proactive approach or a reactive approach.

The establishing may include obtaining LDR information based on a service request frame received from the at least one node included in the group, checking that the at least one node uses the LDR based on the obtained LDR information, starting providing of a multicast service and a broadcast service based on the obtained LDR information, and establishing an LDR link with a node that is able to use an LDR, based on the availability of the LDR.

The establishing may include transmitting, to the at least one node included in the group, a query frame that starts providing a multicast service and a broadcast service, receiving a query response frame with respect to the query frame, checking, based on the query response frame, that the at least one node included in the group uses the LDR, and establishing an LDR link with a node that is able to use the LDR, based on the availability of the LDR.

The communication method may further include receiving, from the at least one node included in the group, a channel report frame, determining a clear-to-send (CTS) node, based on channel information included in the channel report frame, and controlling a request-to-send (RTS) and a CTS based on the determined CTS node.

The communication method may further include transmitting an ACK request frame with respect to the transmitted data frame.

In another general aspect, there is provided a communication apparatus, the apparatus including a link establishing unit configured to establish a link with at least one node included in a group that uses an LDR, a data frame transmitting unit configured to transmit a data frame to the at least one node included in the group, and an ACK receiving unit configured to receive, using a multi-radio based on an availability of the LDR, an ACK with respect to the transmitted data frame.

The ACK receiving unit may be configured to receive the ACK using the LDR or an HDR, based on the availability of the LDR.

The link establishing unit may include an LDR information obtaining unit configured to obtain LDR information based on a service request frame received from the at least one node included in the group, and to check, based on the obtained LDR information, that the at least one node uses the LDR, and an LDR link establishing unit configured to start providing a multicast service and a broadcast service based on the obtained LDR information, and to establish an LDR link with a node that is able to use the LDR, based on the availability of the LDR.

The link establishing unit may include an LDR information obtaining unit configured to transmit, to the at least one node included in the group, a query frame that starts providing a multicast service and a broadcast service, to receive a query response frame with respect to the query frame, and to obtain LDR information, and an LDR link establishing unit configured to check, based on the LDR information, that the at least one node included in the group uses the LDR, and to establish an LDR link with a node that is able to use the LDR, based on the availability of the LDR.

The communication apparatus may further include a node determining unit configured to determine a CTS node, based on channel information included in a channel report frame, and an RTS/CTS controller configured to control an RTS and a CTS, based on the determined CTS node.

The communication apparatus may further include an ACK request frame transmitting unit configured to transmit an ACK request frame with respect to the transmitted data frame, In another general aspect, there is provided a communication method, including transmitting a frame including LDR information to a head of a group to establish a link with the head, receiving a data frame from the head where the link is established, receiving, from the head, an ACK request frame, and transmitting, based on the ACK request frame, an ACK to the head.

The ACK transmitting may include transmitting the ACK to the head using an LDR or an HDR.

The communication method may further include receiving a beacon signal transmitted from at least one neighbor head, obtaining, based on the beacon signal, channel information associated with the at least one neighbor head, and transmitting, to the head of the group, a channel report frame including the channel information of the at least one neighbor head.

The transmitting may include calculating a point in time for transmitting the ACK, based on ACK offset information included in the ACK request frame, and transmitting, to the head, the ACK using one of the LDR and the HDR at the calculated point in time.

In another general aspect, there is provided a communication apparatus, including a link establishing unit configured to transmit a frame including low data-rate radio (LDR) information to a head of a group to establish a link with the head, a data frame receiving unit to receive a data frame from the head where the link is established, an ACK request frame receiving unit to receive, from the head, an ACK request frame, and an ACK transmitting unit to transmit, based on the ACK request frame, an ACK to the head.

The ACK transmitting unit may be configured to transmit the ACK to the head using an LDR or a HDR.

The link establishing unit may receive, from the head, an LDR link request frame, and may establish an LDR link with the head when an LDR link response frame with respect to the LDR link request frame is transmitted to the head.

The communication apparatus may further include a beacon signal receiving unit configured to receive a beacon signal transmitted from at least one neighbor head, a channel information obtaining unit configured to obtain, based on the beacon signal, channel information associated with the at least one neighbor head, and a channel report frame transmitting unit configured to transmit, to the head of the group, a channel report frame including the channel information of the at least one neighbor head.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

According to one or more embodiments, a multicast and broadcast communication methodology increases the reliability of data, while preventing or reducing the collision between groups of a network. The communication methodology may be configured to establish a link via at least one node included in a group that uses a low data-rate radio (LDR). Using the established link, a data frame may be transmitted to the at least one node included in the group. And acknowledgement (ACK) request frames may be received, based on the availability, from one or more nodes included in a group.

Figure 1:
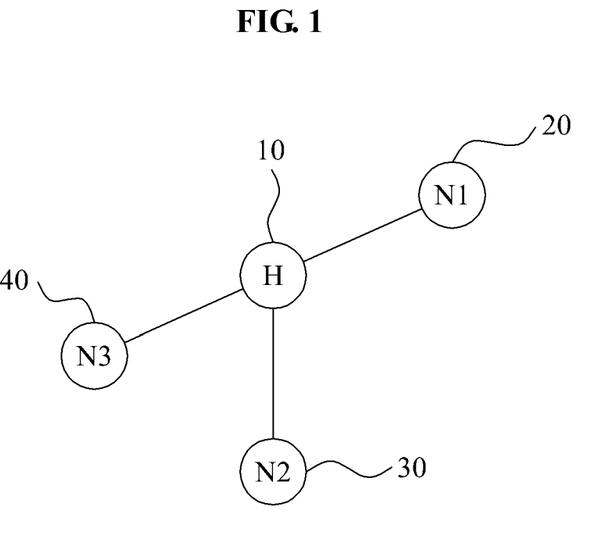
FIG. 1 is a diagram illustrating a network that includes a group that provides a multicast and broadcast communication and that includes nodes included in the group.

FIG. 1 illustrates a network that includes a group that provides a multicast and broadcast communication. The groups may include a head 10 and a node 1 (N1) 20, a node 2 (N2) 30, and a node 3 (N3) 40. The head 10 and the N1 20, the N2 30, and the N3 40 may be mobile or stationary terminals, for example, such as, for example, a smart phone, a digital media broadcasting (DMB) phone, a notebook, a PC, or the like. Of course, it will be appreciated that the group may include fewer or additional nodes, in some instances.

The head 10 of the group may be a transmission node that transmits a data frame to each of the N1 20, the N2 30, and the N3 40. The nodes N1 20, the N2 30, and the N3 40 may be reception nodes that receive the data frame from the head 10. The head 10 and the nodes 20, 30, and 40 may form a network. For example, each of the head 10 and the nodes 20, 30, and 40 may include a high-data rate radio (HDR), and may selectively include a low data-rate radio (LDR). At least one of the head 10 and the N1 20, the N2 30, and the N3 40 may include the LDR, for instance.

Figure 2:
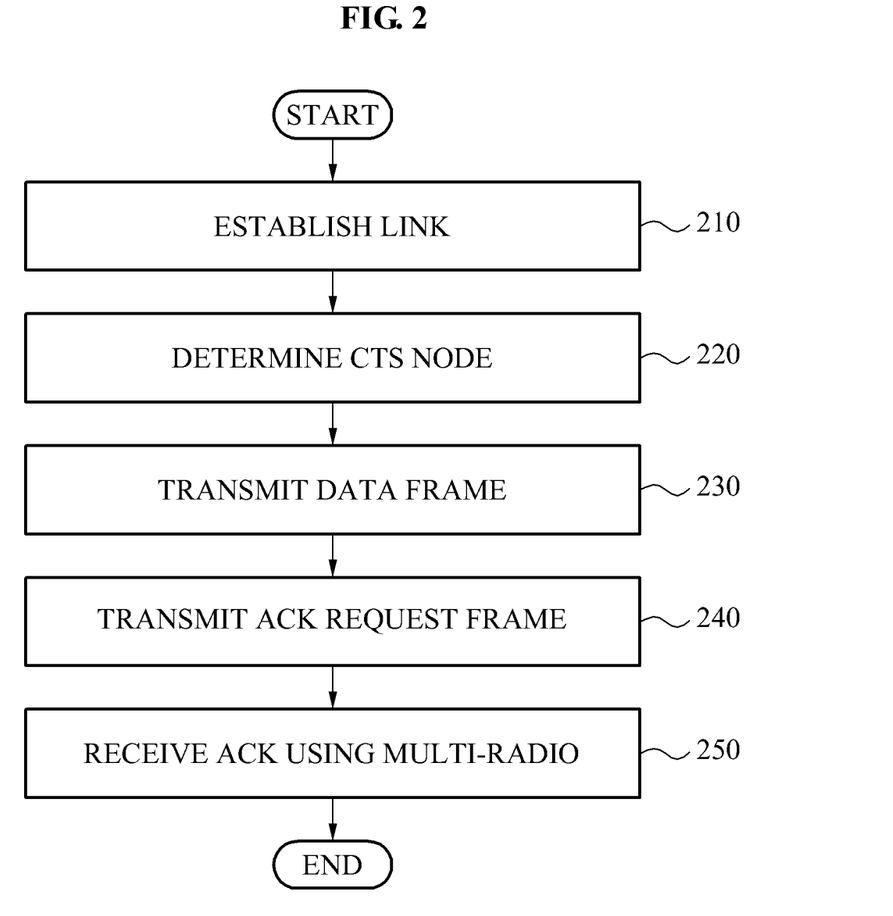
FIG. 2 is a flowchart illustrating a process that performs a multicast and broadcast communication using a multi-radio.

FIG. 2 illustrates a process that performs a multicast and broadcast communication using a multi-radio.

In operation 210, the head 10 may establish a link with at least one node included in a group. For example, the head 10 may establish the link based on either a proactive approach or a reactive approach. The head 10 generally forms the group with multiple nodes. Although, it should be appreciated the head 10 may be able to form a group with a single node, in some instances.

In operation 220, the head 10 may determine a clear-to-send (CTS) node based on a channel report frame received from at least one node from among the multiple nodes included in the group. For example, the head 10 may receive the channel report frame using an LDR. When multiple nodes transmit channel report frames, the head 10 may determine, as the CTS node, one of the nodes that transmit the channel report frames. The head 10 may control a request-to-send (RTS)/CTS.

In operation 230, the head 10 may transmit data frames to the multiple nodes included in the group.

For example, in operation 240, the head 10 may transmit acknowledgement (ACK) request frames to one of more of the nodes included in the group. For example, a predetermined time after the head 10 transmits the data frames, the head 10 may transmit the ACK request frames. The ACK request frame may be a frame that requests an ACK indicating that a node receives a transmitted data frame, and may include radio information and offset information, for instance.

The head 10 may receive ACKs transmitted from one or more nodes using a multi-radio. For example, the head 10 may receive the transmitted ACKs using one of the LDR and an HDR. When a node is able to use an LDR, the head 10 may receive an ACK that the node transmits using the LDR. And when the node is not able to use the LDR, the head 10 may receive an ACK that the node transmits using an HDR.

Figure 3:
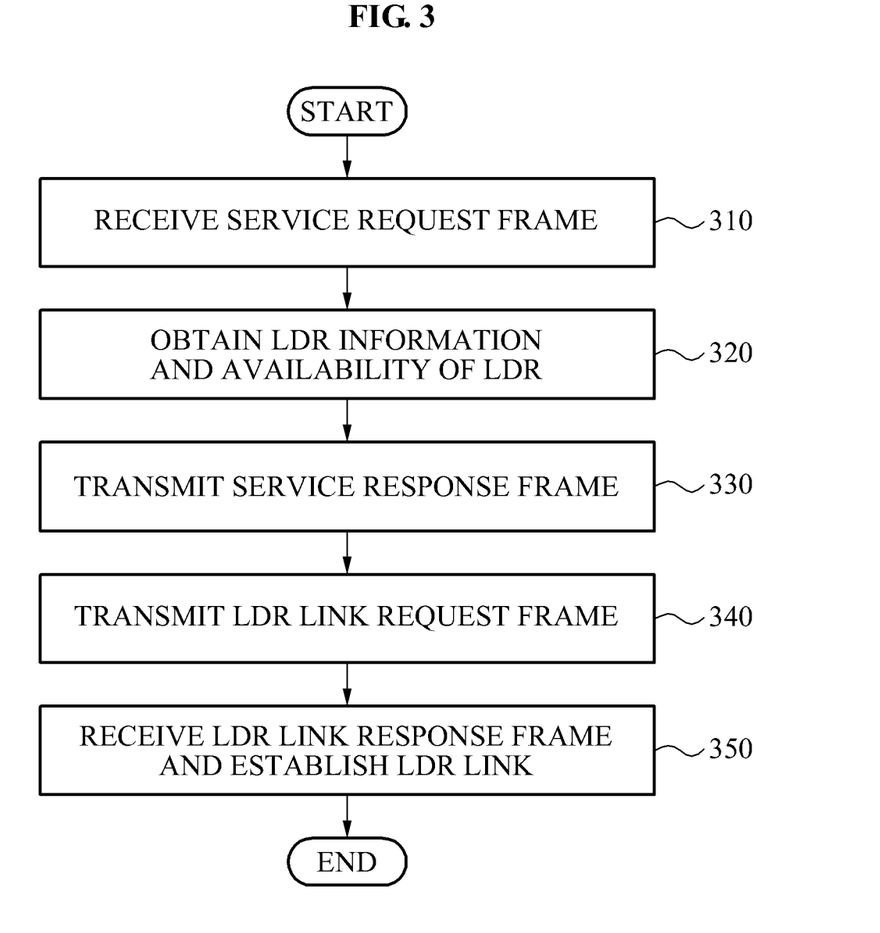
FIG. 3 is a flowchart illustrating a process that establishes a link based on a proactive approach.

According to one or more embodiments, a link between the head and a node may be established either using a proactive approach or a reactive approach. A process that establishes a link using a proactive approach is first described below with reference to FIGS. 3 and 8. The proactive approach may obtain LDR information associated with an LDR of a node before a head provides a multicast service to the node, for instance. In FIG. 3, it may be assumed that an HDR link is already established between the head and one or more nodes.

Figure 8:
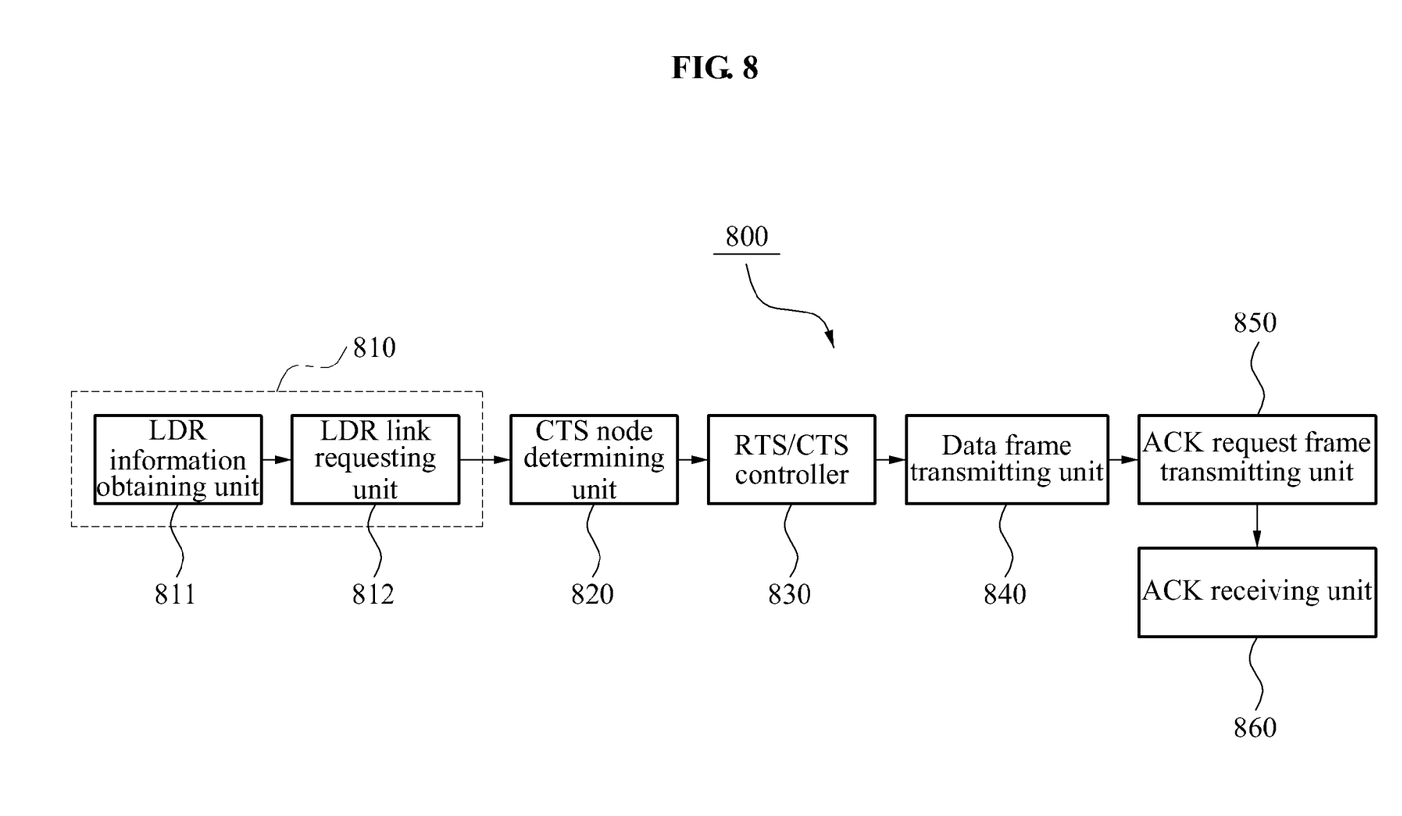
FIG. 8 is a block diagram illustrating a communication apparatus that receives low data-rate radio (LDR) information.

Referring to FIGS. 3 and 8, in operation 310, an LDR information obtaining unit 811 may receive a service request frame. For example, the LDR information obtaining unit 811 may receive the service request frame using an HDR. The LDR information obtaining unit 811 may receive, using the HDR included in the head, the service request frame transmitted using an HDR included in the node. The service request frame may include LDR information associated with the node that requests a service.

For example, when the LDR is included in the node that requests the service, the node may transmit, to the head, the LDR information including an LDR MAC (media access control) address. And when the LDR is not included in the node, the node may set the LDR information as '0' and may transmit the LDR information to the head.

In operation 320, when the LDR information is obtained, the LDR information obtaining unit 811 may be configured to check that the node uses the LDR. For example, the LDR information obtaining unit 811 may separate the LDR information from the service request frame. When the separated LDR information includes the LDR MAC address, the LDR information obtaining unit 811 may determine that the node is able to use the LDR. In this example, the separated LDR information is set as '0', the LDR information obtaining unit 811 may determine that that node does not include the LDR.

In operation 330, the LDR information obtaining unit 811 may be configured to transmit a service response frame, to the node that transmits the service request frame. For example, the LDR information obtaining unit 811 may transmit the service response frame using the HDR. When the service request response frame is received, the multicast and broadcast service may be started between the head and the node.

In operation 340, an LDR link requesting unit 812 may be configured to transmit an LDR link request frame based on an availability of the LDR. For example, the LDR link requesting unit 812 may transmit the LDR link request frame to the node that is able to use the LDR. The LDR link requesting unit 812 may transmit the LDR link request frame using the LDR included in the node. In one embodiment, when multiple nodes are able to use LDRs, the LDR link requesting unit 812 may sequentially transmit LDR link request frames to the multiple nodes. When a Bluetooth scheme is used as the LDR, and a WLAN scheme is used as the HDR, for instance, the LDR link requesting unit 812 may be configured to transmit the LDR link request frame based on the Bluetooth scheme. And, in some instances, when an LDR link is established between the head and the node using the LDR, an inquiry process may be omitted. Therefore, the LDR link may be promptly established.

In operation 350, the LDR link requesting unit 812 may establish the LDR link when an LDR link response frame is received. The LDR link requesting unit 810 may receive the LDR link response frame using the LDR. In this example, the LDR link response frame may include an ACCEPT frame or a REJECT frame.

For example, when a node that receives the LDR link request frame includes an LDR, the node may transmit the ACCEPT frame to the head using the LDR.

In one embodiment, when a node has difficulty in using an LDR, even though the LDR is included in the node, the node may transmit the REJECT frame to the head using the LDR. The LDR link requesting unit 812 may determine that the node has difficult in using the LDR when the REJECT frame is received.

Figure 4:
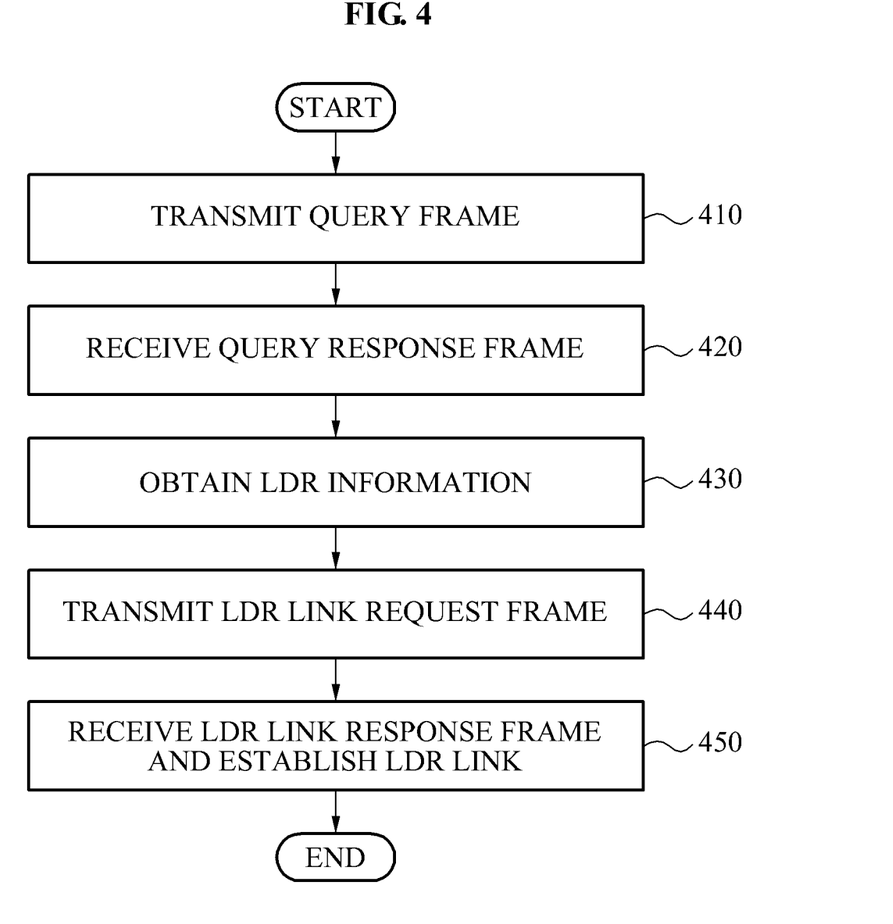
FIG. 4 is a flowchart illustrating a process that establishes a link based on a reactive approach.

A process that establishes a link between the head and a node using a reactive approach is described below with reference to FIGS. 4 and 8. The reactive approach may be a scheme where information exchange between a head and multiple nodes included in a group is not performed before a multicast service is provided. In FIG. 4, it may be assumed that an HDR link is established between the head and one or more nodes.

Referring to FIGS. 4 and 8, in operation 410, the LDR information obtaining unit 811 may be configured to transmit, using an HDR, a query frame to each of the multiple nodes included in the group.

For example, referring again to FIG. 1, when the head 10 and the N1 20, N2 30, and N3 40 form a group, the LDR information obtaining unit 811 may transmit the query frame to each of the N1 20, N2 30, and N3 40. In one embodiment, the LDR information obtaining unit 811 may transmit the query frame after a multicast and broadcast service is started.

In operation 420, the LDR information obtaining unit 811 may receive a query response frame transmitted from each of the multiple nodes included in the group. The query response frame may include LDR information in some instances.

For example, when a node includes an LDR, the node may insert the LDR information including an LDR MAC address to a query response frame and may transmit the query response frame to the head. In one embodiment, when the node does not include the LDR, the node may insert LDR information set as '0' to the query response frame and may transmit the query response frame to the head.

In operation 430, the LDR information obtaining unit 811 may be configured to receive the query response frame, and may obtain the LDR information from the received query response frame. The LDR information obtaining unit 811 may be configured to check that a node uses the LDR. For example, when the LDR MAC address is included in the LDR information, the LDR information obtaining unit 811 may determine that the node is able to use the LDR. When the LDR information is set as '0,' the LDR information obtaining unit 811 may determine that the node does not include the LDR.

In operation 440, the LDR link requesting unit 812 may be configured to transmit an LDR link request frame based on an availability of the LDR.

For example, the LDR link requesting unit 812 may transmit the LDR link request frame to the node that is determined based on the LDR MAC address, to be able to use the LDR. The LDR link requesting unit 812 may transmit the LDR link request frame using the LDR. In some instance, even when the reactive scheme is used, an inquiry process may be omitted by requesting the LDR link using the LDR.

In operation 450, the LDR link requesting unit 812 may be configured to set the LDR link when an LDR link response frame is received. In one embodiment, the LDR link requesting unit 812 may receive the LDR link response frame using the LDR. For example, the LDR link response frame may include an ACCEPT frame or an REJECT frame.

When the LDR is included in the node, the node that receives the LDR link request frame may transmit the ACCEPT frame to the head using the LDR. And, when the node has difficulty in using the LDR (even though the LDR may be included in the node), the node may transmit the REJECT frame to the head using the LDR.

Accordingly, the head may establish an LDR link with the node that transmits the ACCEPT frame from among the multiple nodes. When the LDR link is established between the node and the head, the node and the head may perform the multicast and broadcast communication using at least one of the HDR and the LDR. The head may maintain an HDR link with the node that transmits the REJECT frame.

Figure 5:
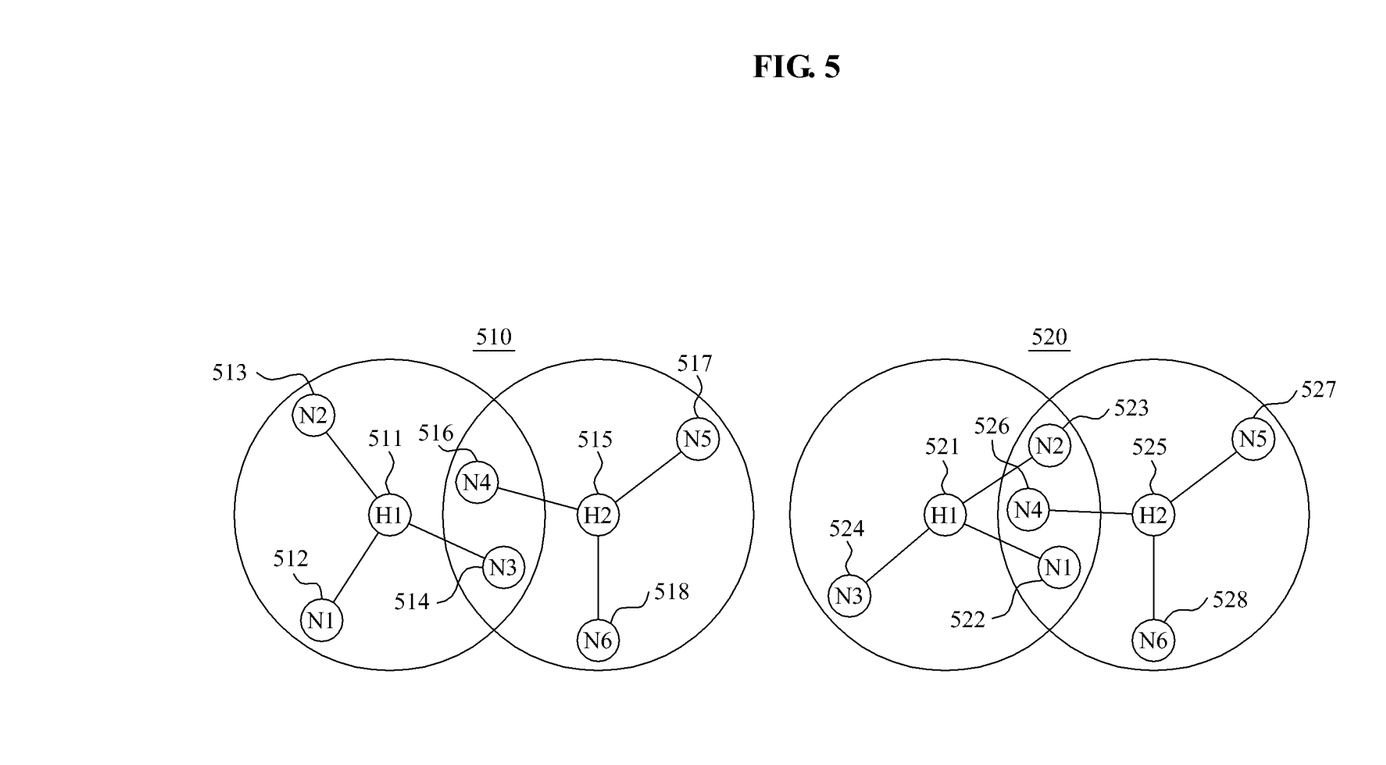
FIGS. 5 and 6 are diagrams illustrating a process that determines a clear-to-send (CTS) node from among multiple nodes included in a group.
Figure 6:
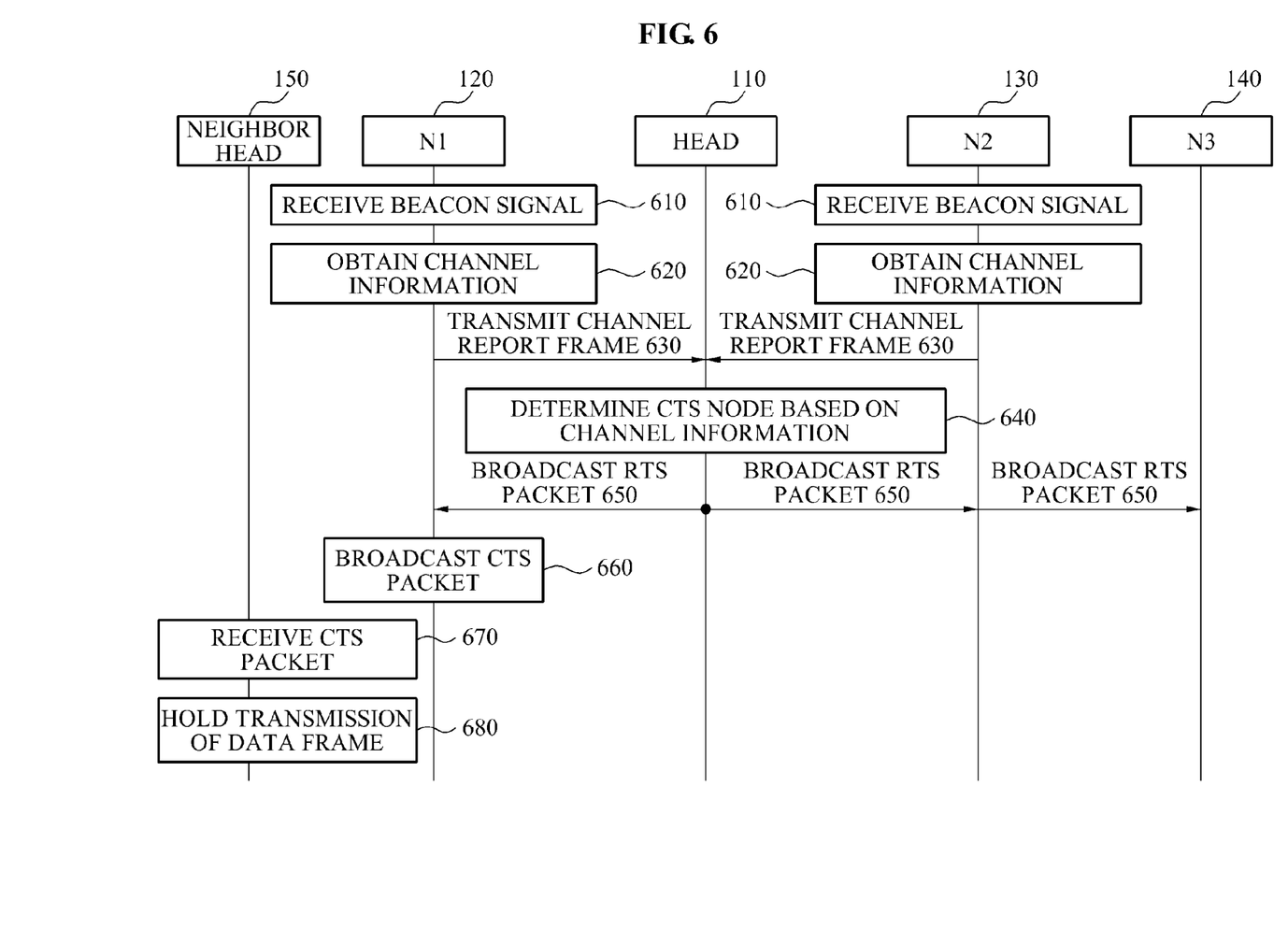

FIGS. 5 and 6 illustrate a process that determines a CTS node from among multiple nodes included in a group.

Referring to an example 510 of FIG. 5, a head 1 (H1) 511 may form a group with a node 1 (N1) 512, a node 2 (N2) 513, and a node 3 (N3) 514, and a head 2 (H2) 515 may form a group with a node 4 (N4) 516, a node 5 (N5) 517, and a node 6 (N6) 518. For example, the H2 515 may be an adjacent neighbor head of the H1 511. The N3 514 may be located in an area where the N3 514 is able to receive a beacon signal transmitted from the H2 515. Accordingly, the N3 514 may receive interference due to a signal transmitted from the H2 515, in addition to a signal transmitted from the H1 511 included in the group where the N3 514 is included.

Similarly, the N4 516 may receive interference due to a signal transmitted from the H1 511 in addition to a signal transmitted from the H2 515 included in the group where the N4 516 is included. To reduce or to remove interference, a head of each group may determine a CTS node and may control RTS/CTS using the determined CTS node.

A process of determining the CTS node may be described with reference to FIG. 6. Referring to FIG. 6, a node 1 (N1) 120, a node 2 (N2) 130, and a node 3 (N3) 140 may form the same group with the head 110. It may be assumed that the N1 120 and the N2 130 are nodes that receive beacon signals transmitted from a neighbor head as illustrated in an example 520 of FIG. 5 and thus, may receive interference, and the N3 140 is a node that does not receive interference from the neighbor head.

Referring to FIG. 6, the N1 120, the N2 130, and the N3 140 may periodically detect whether another multicast group exists around the N1 120, the N2 130, and the N3 140.

For example, in operation 610, the N1 120 and the N2 130 may receive beacon signals transmitted from a neighbor head 150. The N1 120 and the N2 130 may receive the beacon signals transmitted from the neighbor head 150 using an HDR.

In operation 620, each of the N1 120 and the N2 130 may obtain channel information associated with a neighbor head based on the received beacon signal. In some implementations, the channel information may include identification (ID) information associated with an ID of the neighbor head and received signal strength indicator (RSSI) information associated with an RSSI. For example, the ID information associated with the ID of the neighbor head may include an ID to identify a group where the neighbor head is included. The RSSI information associated with the RSSI may denote an intensity of a signal received using the HDR.

In operation 630, each of the N1 120 and the N2 130 may generate a channel report frame including the obtained channel information, and may transmit the channel report frame to the head 110.

For example, when an LDR link with the head 110 is established, each of the N1 120 and the N2 130 may transmit the channel report frame. When the LDR link is not established, each of the N1 120 and the N2 130 may transmit the channel report frame using the HDR. The head 110 may receive, through the LDR or the HDR, the channel report frame based on each of the LDR link with the N1 120 and the LDR link with the N2 130.

In operation 640, the head 110 may extract the channel information from the channel report frame transmitted from each of the N1 120 and the N2 130, and may determine the CTS node based on the extracted channel information. In one embodiment, the head 110 may compare the RSSI information of the N1 120 and the RSSI information of the N2 130, and may determine, as the CTS node, a node having a high RSSI from among the N1 120 and the N2 130.

For example, referring to the example 520 of FIG. 5, when an RSSI of a node 1 (N1) 522 is higher than an RSSI of a node 2 (N2) 523, a head 1 (H1) 521 may determine the N1 522 as the CTS node.

For another example, referring to the example 510 of FIG. 5, when a single node, for example, the N3 514, transmits the channel report frame, the H1 511 may determine the N3 514 as the CTS node.

In operation 650, the head 110 may broadcast an RTS packet to multiple nodes included in the group. The multiple nodes may receive the RTS packet. For example, the head 110 may broadcast the RTS packet to the N1 120, the N2 130, and the N3 140. In one embodiment, the RTS packet may include information associated with the determined CTS node. The CTS node information may denote a node ID for identifying a node determined as the CTS node.

In one implementation, when a CTS node is determined for each group, the RTS packet may include CTS transmission information. The CTS transmission information may denote a sequence of a CTS packet to be broadcasted.

In operation 660, the N1 120 that is determined as the CTS node may broadcast a CTS packet.

For example, the N1 120, the N2 130, and the N3 140 that establish the group with the head 110 may receive the RTS packet. The N1 120, the N2 130, and the N3 140 may extract CTS node information from the RTS packet. In one embodiment, the N2 130 and the N3 140 may determine that the N2 130 and the N3 140 are not determined as the CTS node.

The N1 120 may determine that the N1 120 is determined as the CTS node, based on the extracted CTS node information, for instance. And the N1 120 may broadcast a CTS packet based on the node transmission information.

In operation 670, the neighbor head 150 may receive the CTS packet broadcasted from the N1 120.

In operation 680, the neighbor head 150 may stop transmitting data frame during a predetermined time. Accordingly, the N1 120 may prevent collision of data frames transmitted from the neighbor head 150 and the head 110 where the N1 120 is included.

Figure 7:
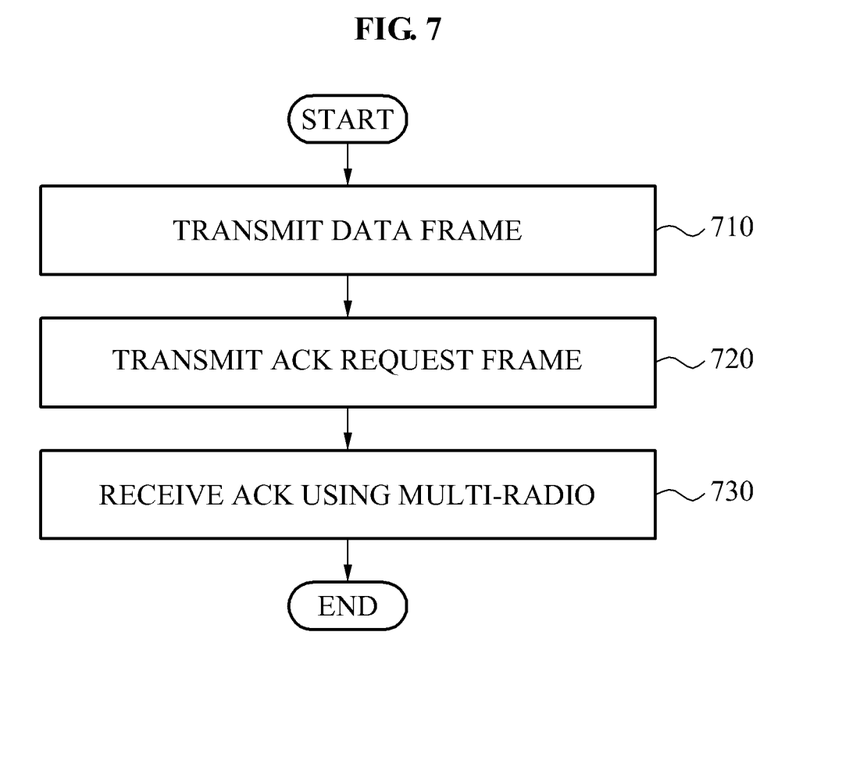
FIG. 7 is a flowchart illustrating a process that receives an acknowledgement (ACK) with respect to a data frame using a multi-radio.

FIG. 7 illustrates a process that receives an ACK with respect to a data frame using a multi-radio.

In operation 710, the head 110 may transmit a data frame to each of multiple nodes included in a group.

For example, to prevent data collision led by a neighbor head, the head 110 may transmit the data frame after RTS/CTS control is completed. In this example, the head 110 may transmit the data frame using an HDR.

In operation 720, the head 110 may transmit an ACK request frame with respect to the transmitted data frame, to each of the multiple nodes included in the group. In this example, the head 110 may transmit the ACK request frame using the HDR.

The ACK request frame may include ACK radio information and ACK offset information. The head 110 may set the ACK radio information as one of an LDR and an HDR. The ACK radio information may denote information informing a node of a radio that is to be used for transmitting an ACK from among the LDR and the HDR, for example.

The ACK offset information may denote information informing a node of a time when the ACK is to be transmitted. In one embodiment, the ACK offset information may include an offset value that is determined based on a time when the ACK request frame is transmitted. For example, when the ACK offset information is 'a' seconds, the ACK offset information indicates that a node transmits an ACK 'a' seconds after the time when the ACK request frame is transmitted.

In operation 730, the head 110 may receive the ACK from each of the multiple nodes included in the group, using a multi-radio.

For example, when each of a node (N1) and a node 2 (N2) establishes an LDR link and a node 3 (N3) does not establish an LDR link, the head 110 may transmit an ACK request frame of which ACK radio information is set as the LDR, to each of the N1 and the N2. The head 110 may transmit an ACK request frame of which ACK radio information is set as the HDR, to the N3. Therefore, the head 110 may receive an ACK transmitted from each of the N1 and the N2 using the LDR, and may receive an ACK transmitted from the N3 using the HDR.

FIG. 8 illustrates an example of a communication apparatus 800 that is configured to receive LDR information. The communication apparatus 800 may comprise a head included in a group. It may be assumed that an HDR link is established between the head and one or more nodes included in the group.

In some embodiments, as shown, the communication apparatus 800 may include a link establishing unit 810, a CTS node determining unit 820, an RTS/CTS controller 830, a data frame transmitting unit 840, an ACK request frame transmitting unit 850, and an ACK receiving unit 860.

The link establishing unit 810 may include an LDR information obtaining unit 811 and an LDR link requesting unit 812. The link establishing unit 810 may be configured to establish a link with at least one node included in the group, based on one of a proactive approach and a reactive approach.

For example, when the proactive approach is used, the LDR information obtaining unit 811 may obtain LDR information by extracting the LDR information from a service request frame. In one embodiment, the LDR information may include '0' or an LDR MAC address of a node that transmits the service request frame. The LDR information obtaining unit 810 may be configured to check, based on the obtained LDR information, that the node uses an LDR.

In another embodiment, when the reactive approach is used, the LDR information obtaining unit 811 may be configured to check that the node uses the LDR, based on LDR information obtained through a query frame.

The LDR link requesting unit 812 may be configured to transmit a link request frame to the node that is able to use the LDR, based on an availability of the node. The LDR link requesting unit 812 may be configured to establish the LDR link when an LDR link response frame with respect to the LDR link request frame is received. The link establishing unit 810 may be configured to check an availability of the LDR, with respect to each of multiple nodes included in the group, and may establish a link with a node that is able to use the LDR.

The CTS node determining unit 820 may be configured to extract channel information from a channel report frame, and may determine, based on the channel information, a CTS node from among nodes included in the group. In one embodiment, the channel information may include ID information of a neighbor head and RSSI information. The CTS node determining unit 820 may receive the channel report frame transmitted from the node using the LDR, for instance.

For example, when multiple nodes transmit channel report frames, the CTS node determining unit 820 may determine a node having a highest RSSI as the CTS node.

In one embodiment, when a single node transmits a channel report frame, the CTS node determining unit 820 may be configured to determine the node that transmits the channel report frame as the CTS node.

The RTS/CTS controller 830 may be configured to broadcast an RTS packet to the multiple nodes included in the group. For example, the RTS packet may include determined CTS node information. The CTS node information may denote a node ID to be used for identifying a node that is determined as the CTS node. The CTS node may determine that the CTS node is itself, based on the RTS packet, and may broadcast a CTS packet. The neighbor head that receives the CTS packet may stop transmitting data frame during a predetermined time.

The data frame transmitting unit 840 may be configured to transmit a data frame to each of the multiple nodes included in the group. For example, the data frame transmitting unit 840 may transmit the data frame using an HDR.

The ACK request frame transmitting unit 850 may be configured to transmit an ACK request frame with respect to the transmitted data frame, to each of the multiple nodes included in the group. In one embodiment, the ACK request frame transmitting unit 850 may transmit the ACK request frame using the HDR. The ACK request frame may include ACK radio information and ACK offset information, for instance.

For example, the ACK request frame transmitting unit 850 may set, based on an availability of an LDR, the ACK radio information as one of the LDR and the HDR. The ACK request frame transmitting unit 850 may transmit, an ACK request frame where the ACK radio information is set, to each of the multiple nodes included in the group.

The ACK receiving unit 860 may be configured to receive an ACK with respect to the transmitted data frame using a multi-radio.

For example, the ACK receiving unit 860 may receive, based on ACK radio information, an ACK transmitted using the LDR or the HDR. In one embodiment, each of the multiple nodes included in the group may transmit the ACK at different points in time, based on the ACK offset information. Accordingly, the transmission of the ACK based on the LDR or the HDR may be performed in parallel and thus, a point in time where each radio transmits an ACK may not affect a point in time where another radio transmits an ACK.

Figure 9:
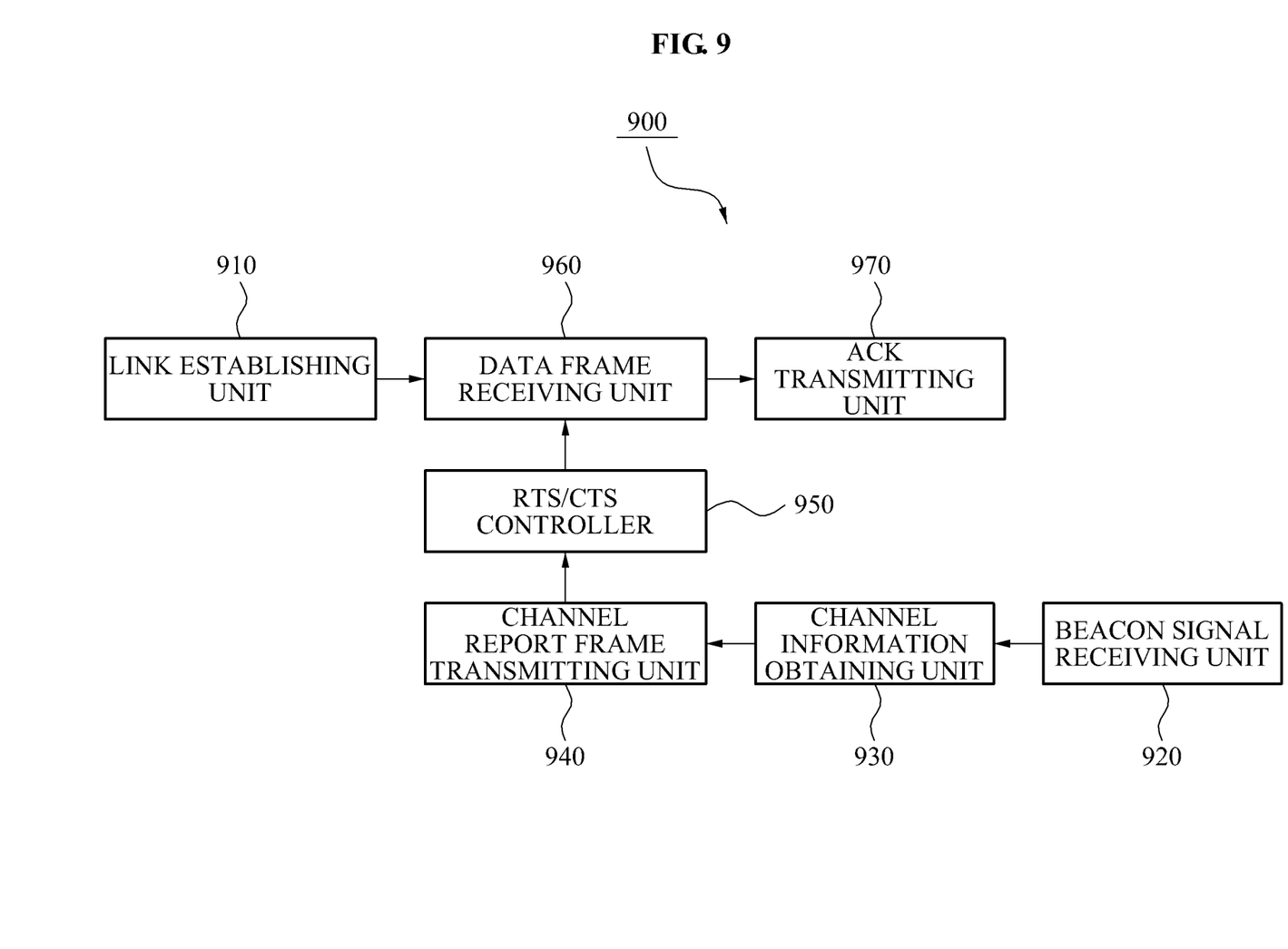
FIG. 9 is a block diagram illustrating a communication apparatus that transmits LDR information.

FIG. 9 illustrates a communication apparatus 900 that transmits LDR information. The communication apparatus may be a node included in a group. It may be assumed that an HDR link between a head and one or more nodes included in the group is established.

The communication apparatus 900, as shown, may include a link establishing unit 910, a beacon signal receiving unit 920, a channel information obtaining unit 930, a channel report frame transmitting unit 940, an RTS/CTS controller 950, a data frame receiving unit 960, and an ACK transmitting unit 970.

The link setting unit 910 may be configured to transmit a frame including LDR information to the head in the group to establish a link with the head. In one embodiment, the link establishing unit 910 may be configured to establish the link with the head, based on one of a proactive approach and a reactive approach. The LDR information may include an LDR MAC address or '0,' for instance.

For example, when an LDR is included in the communication apparatus 900, the link establishing unit 910 may set the LDR information as the LDR MAC address, and may transmit, to the head in the group, the frame where the LDR information is set. In one embodiment, the frame where the LDR information is set may include a service use frame or a query response frame.

When the LDR is included in the communication apparatus 900, the link establishing unit 910 may be configured to set the LDR information as '0', and may transmit, to the head in the group, the frame where the LDR information is set, for instance.

And when an LDR link request frame is received, the link establishing unit 910 may be configured to transmit an LDR link response frame to the head and thus, may establish an LDR link with the head. In one embodiment, the LDR link response frame may include an ACCEPT frame or an REJECT frame. For example, when the communication apparatus 900 is able to use the LDR, the link setting unit 910 may transmit the ACCEPT frame to the head using the LDR. When the communication apparatus 900 has difficulty in using the LDR, even though the LDR is included in the communication apparatus 900, the link setting unit 910 may transmit the REJECT frame to the head using the LDR.

The beacon signal receiving unit 920 may be configured to receive a beacon signal transmitted from a neighbor head.

The channel information obtaining unit 930 may be configured to obtain channel information associated with the neighbor head based on the received beacon signal. The channel information may include ID information associated with the neighbor head and RSSI information. For example, the ID information associated with the neighbor head may include an ID to be used for identifying a group where the neighbor head is included in.

The channel report frame transmitting unit 940 may be configured to transmit, to the head in the group, a channel report frame including the channel information associated with the neighbor head. For example, when the LDR link is established, the channel report frame transmitting unit 940 may transmit the channel report frame using the LDR. When the LDR link is not established, the channel report frame transmitting unit 940 may be configured to transmit the channel report frame to the head using the HDR.

The RTS/CTS controller 950 may be configured receive an RTS packet from the head and may extract CTS node information. For example, the RTS/CTS controller 950 may determine whether the communication apparatus 900 is determined as the CTS node, based on the extracted CTS node information.

In one embodiment, when the communication apparatus 900 is determined as the CTS node, the RTS/CTS controller 950 may broadcast the CTS packet. The head that receives the CTS packet may stop transmitting a data frame during a predetermined time. The RTS/CTS controller 950 may perform the RTS/CTS controlling and thus, may prevent collision led by a data frame transmitted from the neighbor head.

The data frame receiving unit 960 may be configured to receive the data frame transmitted from the head. For example, the data frame receiving unit 960 may receive the data frame using the HDR, after the RTS/CTS controlling is completed.

In one embodiment, the data frame receiving unit 960 may be configured to receive an ACK request frame transmitted from the head, after receiving the data frame. For example, the ACK request frame may include ACK radio information and ACK offset information.

The ACK transmitting unit 970 may be configured to calculate a point in time for transmitting an ACK, based on the ACK offset information. For example, the ACK transmitting unit 970 may calculate the point in time for transmitting the ACK by calculating the ACK offset information based on a point in time when the ACK request frame is transmitted from the head.

In one embodiment, the ACK transmitting unit 970 may be configured to transmit, based on the ACK radio information, the ACK to the head at the point in time for transmitting the ACK, using one of the LDR and the HDR. The head may receive ACKs transmitted using different radios respectively from the multiple nodes included in the group. For example, the head may receive the ACK transmitted from a node 1 and a node 2 using the LDR, and the head may receive the ACK transmitted from a node 3 using the HDR.

One or more of the embodiments described herein may receive an acknowledgement (ACK) using a low data-rate radio (LDR) and thus, a power consumption may be reduced and a battery power may increase. And the embodiments described herein may transmit a data frame using a high data-rate radio (HDR) to provide a massive capacity multimedia stream, and may receive an ACK using an LDR to improve a reliability of data.

One or more of the embodiments described herein may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a head node, the method comprising:
    receiving, from each of a plurality of nodes, a channel report frame including channel information provided by a neighbor head node;
    selecting one of the plurality of nodes to be a communication partner based on the received channel information;
    transmitting a data frame to the selected node;
    transmitting, to the selected node, an ACK request frame which requests an ACK indicating whether the data frame is received; and
    receiving, from the selected node using a multi-radio based on an availability of low data-rate radio (LDR), an acknowledgement (ACK) of having received the transmitted data frame, wherein
    when the selected node is able to use the LDR, the receiving the ACK comprises receiving the ACK using the LDR, and when the selected node is not able to use the LDR, the receiving the ACK comprises receiving the ACK using high data-rate radio (HDR).

2. The method of claim 1, further comprising controlling a request-to-send (RTS) signal and a clear-to-send (CTS) signal based on the selected node.

3. The method of claim 1, wherein the ACK request frame includes ACK radio information and ACK offset information.

4. The method of claim 3, wherein the transmitting comprises:
    establishing the ACK radio information based on whether the selected node is able to use LDR.

5. The method of claim 1, further comprising:
    establishing a link via at least one node included in a group that uses a low data-rate radio (LDR).

6. The method of claim 5, wherein the link is established using a proactive approach or a reactive approach.

7. The method of claim 5, wherein establishing the link comprises:
    obtaining LDR information based on a service request frame received from the selected node;
    checking whether the selected node uses LDR based on the obtained LDR information;
    providing a multicast service and a broadcast service based on the obtained LDR information; and
    establishing an LDR link with the selected node if the selected node is able to use LDR.

8. The method of claim 5, wherein establishing the link comprises:
    transmitting, to the selected node, a query frame that starts a multicast service and a broadcast service;
    receiving a query response frame with respect to the query frame;
    checking, based on the query response frame, whether the selected node uses LDR; and
    establishing an LDR link with the selected node if the selected node is able to use LDR.

9. A communication apparatus comprising:
    a receiver configured to receive, from each of a plurality of nodes, a channel report frame including channel information provided by a neighbor head node;
    a selection unit configured to select one of the plurality of nodes to be a communication partner based on the received channel information;
    a data frame transmitting unit configured to transmit a data frame to the selected node;
    an ACK request frame transmitting unit configured to transmit, to the selected node, an ACK request frame which requests an ACK indicating whether the data frame is received; and
    an acknowledgement (ACK) receiving unit configured to receive, from the selected node based on an availability of low data-rate radio (LDR), an ACK of having received the transmitted data frame, wherein
    when the selected node is able to use the LDR, the ACK receiving unit receives the ACK using the LDR, and when the selected node is not able to use the LDR, the ACK receiving unit receives the ACK using high data-rate radio (HDR).

10. The apparatus of claim 9, further comprising a ready-to-send (RTS)/clear-to-send (CTS) controller configured to control an RTS signal and a CTS signal based on the selected node.

11. The apparatus of claim 9, wherein the ACK request frame includes ACK radio information and ACK offset information.

12. The apparatus of claim 11, wherein the ACK request frame transmitting unit is configured to set the ACK radio information to indicate one of LDR and HDR, based on whether the selected node is able to use LDR.

13. The apparatus of claim 9, further comprising:
    a link establishing unit configured to establish a link with at least one node included in a group that uses a low data-rate radio (LDR).

14. The apparatus of claim 13, wherein the link establishing unit is configured to establish the link with the selected node using a proactive approach or a reactive approach.

15. The apparatus of claim 13, wherein the link establishing unit comprises:
    an LDR information obtaining unit configured to obtain LDR information based on a service request frame received from the selected node, and to check, based on the obtained LDR information, that the selected node uses LDR; and
    an LDR link establishing unit configured to provide a multicast service and a broadcast service based on the obtained LDR information, and to establish an LDR link with the selected node if the node is able to use LDR.

16. The apparatus of claim 13, wherein the link establishing unit comprises:
    an LDR information obtaining unit configured to transmit, to the selected node, a query frame that provides a multicast service and a broadcast service, to receive a query response frame with respect to the query frame, and to obtain LDR information; and
    an LDR link establishing unit configured to check, based on the LDR information, whether the selected node uses LDR, and to establish an LDR link with the selected node if the selected node is able to use LDR.

17. A communication method executed by a node, the method comprising:
    transmitting a frame including low data-rate radio (LDR) information to a head node of a group to establish a link with the head node;

receiving a data frame from the head node where the link is established;

receiving, from the head node, an acknowledgement (ACK) request frame which requests an ACK indicating whether the data frame is received;

transmitting, to the head node, an ACK in response to the ACK request frame;

receiving a beacon signal transmitted from a neighbor head node;

obtaining, based on the beacon signal, channel information associated with the neighbor head node; and transmitting, to the head node of the group, a channel report frame including the channel information of the neighbor head node, wherein the head node performs receiving, from each of a plurality of nodes, a channel report frame including channel information provided by a neighbor head node, and selecting one of the plurality of nodes to be a communication partner based on the received channel information; and wherein when the node is able to use the LDR, the transmitting the ACK comprises transmitting the ACK using the LDR, and when the node is not able to use the LDR, the transmitting the ACK comprises transmitting the ACK using high data-rate radio (HDR).

18. The method of claim 17, wherein the link is established with the head node of the group using a proactive approach or a reactive approach.

19. The method of claim 17, wherein the establishing comprises:

receiving, from the head node, an LDR link request frame; and establishing an LDR link with the head node when an LDR link response frame with respect to the LDR link request frame is transmitted to the head node.

20. The method of claim 17, wherein the transmitting comprises:

scheduling a point in time for transmitting the ACK, based on ACK offset information included in the ACK request frame; and transmitting, to the head node, the ACK at the scheduled point in time.

21. A communication apparatus comprising:

a link establishing unit configured to transmit a frame including low data-rate radio (LDR) information to a head node of a group to establish a link with the head node;

a data frame receiving unit configured to receive a data frame from the head node where the link is established;

an acknowledgement (ACK) request frame receiving unit configured to receive, from the head node, an ACK request frame which requests an ACK indicating whether the data frame is received; and an ACK transmitting unit configured to transmit, to the head node, an ACK in response to the ACK request frame;

a beacon signal receiving unit configured to receive a beacon signal transmitted from a neighbor head node;

a channel information obtaining unit configured to obtain, based on the beacon signal, channel information associated with the neighbor head node; and a channel report frame transmitting unit configured to transmit, to the head node of the group, a channel report frame including the channel information of the neighbor head node, wherein the head node comprises:

a receiver configured to receive, from each of a plurality of nodes, a channel report frame including channel information provided by a neighbor head node; and a selection unit configured to select one of the plurality of nodes to be a communication partner based on the received channel information; and wherein when the communication apparatus is able to use the LDR, the ACK transmitting unit transmits the ACK using the LDR, and when the communication apparatus is not able to use the LDR, the ACK transmitting unit transmits the ACK using high data-rate radio (HDR).

22. The apparatus of claim 21, wherein the link establishing unit is configured to establish the link with the head node of the group using a proactive approach or a reactive approach.

23. The apparatus of claim 21, wherein the link establishing unit is configured to receive, from the head node, an LDR link request frame, and to establish an LDR link with the head node when an LDR link response frame with respect to the LDR link request frame is transmitted to the head node.

* * * * *